March 15, 1966     W. C. MORELAND II     3,240,991

STATIC INVERTER

Filed Oct. 1, 1964

WITNESSES
Theodore F. Wrobel
Paul Hentzel

INVENTOR
William C. Moreland II
BY W. D. Palmer
ATTORNEY

United States Patent Office 3,240,991
Patented Mar. 15, 1966

3,240,991
STATIC INVERTER
William C. Moreland II, Pittsburgh, Pa., assignor to Westinghouse Electric Corporation, Pittsburgh, Pa., a corporation of Pennsylvania
Filed Oct. 1, 1964, Ser. No. 400,750
6 Claims. (Cl. 315—239)

This application is a continuation-in-part of my copending application Serial No. 110,090 filed May 15, 1961 and assigned to the same assignee as the present invention, now abandoned.

The present invention relates to a circuit for inverting direct current into alternating current, and more particularly to an inverter employing gaseous discharge devices and solid state devices.

Heretofore, it has been known to employ gaseous discharge tubes in inverter circuits. These tubes have a conductive and a nonconductive state which are responsive to the applied voltage. Two tubes are required to accomplish the inverting. As the first tube switches from one conductive state to the other, the second tube switches in the opposite direction. The tubes take turns providing a conductive path for the applied direct current. The load is placed in a location common to both paths so as to receive current in one direction from one path and in the other direction in the other path. Circuits of this type are disclosed by Seizen, U.S. Patent 2,609,506 filed August 3, 1948.

An undesirable limitation of such prior circuits is the slow speed at which the tubes change states. A further undesirable feature is resistance of the tube in the conductive state which generates heat and wastes electrical power. Also, if the characteristics of the tubes are not matched, unsymmetrical operation will occur. In an initially matched circuit, aging of the tubes may destroy the matching. Further, these prior art inverters do not employ an energy storing means for storing switching energy, which if released at the proper time, would provide a fast and stable switching period.

It is therefore an object of this invention to provide an improved inverter employing solid state devices.

Another object of this invention is to provide a very fast inverter circuit.

A further object of this invention is to provide a very efficient inverter circuit.

An additional object of this invention is to provide an inverter circuit which does not require matching of the bistable devices employed.

A more specific object of this invention is to provide an inverter circuit in which a single element initiates the switching for both half cycles.

Yet another object of this invention is to provide an inverter circuit which stores switching energy in the half cycle previous to the switching.

Briefly, these and other objects of the invention are achieved by providing a charge path and a discharge path which alternately delivers current through the load. During the first half cycle the charge path delivers current from a D.C. source in one direction through the load, while simultaneously delivering current to an electrical energy storing device, for example a capacitor, located in the charge path. During the second half cycle the discharge path delivers the current stored in the capacitor storing device through the load in the other direction. In order to periodically establish and interrupt the continuity of each path, each path is provided with a switching means. Negative resistance diodes and other semiconductor devices may be used for these switches. The switches are activated periodically by an energy storing device such as a transformer, one winding of which is serially connected in each path. The energy required to accomplish the switching is stored in the form of a magnetic field in the transformer core. The switching energy is replenished after each switching by either the D.C. source or the capacitor storing device during the first and last half cycle respectively. When the D.C. source or capacitor delivers current to the load, the transformer storing device is simultaneously charged by the current flow. In order that the switching energy may be released periodically, a timing or sensing device is provided which has two conductive states responsive to some circuit parameter. Any device, such as a fluorescent lamp, responsive to the voltage thereacross may be employed as this sensing device. As the sensing device switches from the higher conductive state to the lower conductive state, the current therethrough is decreased causing the magnetic field to partially collapse. The collapsing field generates voltages which complete the switching of the sensing device.

The novel features which are believed to be characteristic of the invention, both as to its organization and method of operation, together with further objects and advantages thereof, will be better understood from the following detailed description considered in connection with the accompanying drawings in which several embodiments of the invention are illustrated by way of example. It is to be expressly understood, however, that the accompanying drawings are for the purpose of illustration and description only, and are not intended as a definition of the limits of the invention. Referring to the drawings:

Figure 5:
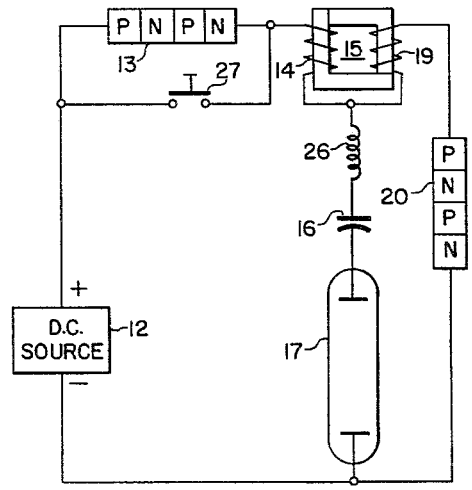
Figure 6:
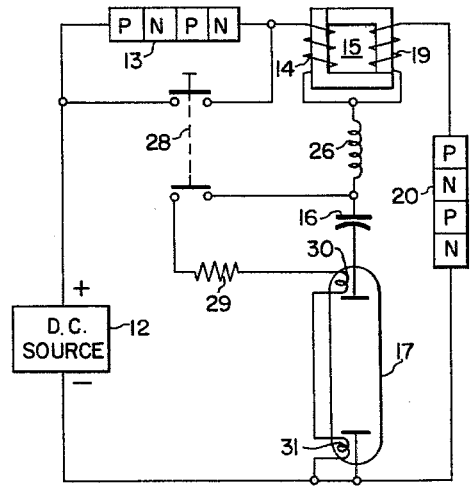

FIG. 5 is a schematic diagram of the invention showing series ballast inductor 26 and starting switch 27; and FIG. 6 is a schematic diagram of the invention provided with a starting switch 28, a series ballast 26, a current limiting resistor 29, and filament heaters 30 and 31.

Figure 1:
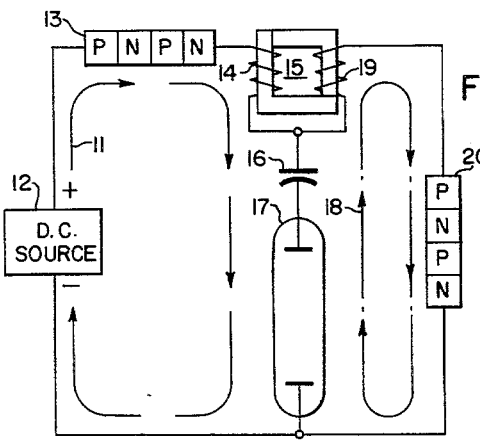
FIGURE 1 is a schematic diagram of the preferred embodiment of the invention.

FIG. 1 shows a charge path 11 which includes a direct current source 12, diode 13, winding 14 of transformer 15, capacitor 16 and fluorescent lamp 17. The direct current source 12 charges the capacitor 16 through the charge path 11 delivering current to the fluorescent lamp 17 in the direction of the charge path 11. The charging can occur only when the diode 13 is conducting and the diode 20 is nonconducting. Also shown is a discharge path 18 which includes capacitor 16, winding 19 of transformer 15, diode 20 and fluorescent lamp 17. The capacitor 16 discharges through the discharge path 18 delivering current to the fluorescent lamp 17 in the other direction. For this discharging to occur the diode 20 must be conducting and the diode 13 must be nonconducting. Alternating current is delivered to the fluorescent lamp 17 by successively switching the conducting states of the diodes 13 and 20.

The diodes 13 and 20 are four layer diodes or silicon controlled rectifiers, both of which exhibit negative resistance characteristics. These diodes have a conducting or breakdown low impedance state and a nonconducting or recovered high impedance state. Other bistable switching devices may be employed in the invention, but four layer diodes and silicon controlled rectifiers are preferred because they are hyperconductive when in the low impedance state and therefore absorb practically no power and generate practially no heat when in the conducting state. The conductive state of these diodes is determined by the voltage across them. At low voltages the diodes have a high impedance which is their normal ohmic impedance. At high voltages the diode electrons exhibit avalanching and a substantially zero impedance state is effected. During the operation of the circuit the diodes are always in opposite impedance states. When the diode 13 is in the high impedance state, the diode 20 is in the low impedance states, and conversely.

The heart of the circuit is getting the diodes to switch states and to switch states at the proper time. The fluorescent lamp 17 determines when the switching will occur. To illustrate, assume the circuit to be in operation, with the diode 13 in the low impedance state and the diode 20 in the high impedance state. The fluorescent lamp 17 is operating and the capacitor 16 is being charged by the direct current source 12 through the charge path 11. A magnetic field is established in the core of the transformer 15 because the charging current passes through the winding 14. As the voltage across the capacitor 16 builds up, less voltage appears across the fluorescent lamp 17. Eventually the voltage across the fluorescent lamp 17 will be insufficient to maintain the gaeous discharge therein. This rapidly decreases the charging current, and the switching of the conductive states of the diodes 13 and 20 is initiated.

The actual switching is accomplished by the transformer 15 and capacitor 16. The magnetic field maintained in the transformer 15 by the charging current starts to collapse. The collapsing magnetic field prolongs the current flow and charges the capacitor 16 to a higher and higher voltage. This voltage can be greater than that of the direct current source 12. The energy of the magnetic field in the transformer 15 is diminishing, and the energy of the electric field in the capacitor 16 is increasing at an equal rate.

While this energy is relocating, voltages appear across the windings 14 and 19. The voltage across the winding 14, as indicated above, tends to keep the present current flowing and aids the voltage of the direct current source 12. The sum of these voltages cause the diode 13 to remain in the low impedance state. The voltage appearing across the winding 19 aids the charge on the capacitor 16. The two latter voltages are of the correct polarity to break down the diode 20 and fluorescent lamp 17, and start a current flow which would discharge the capacitor 16. Remember that the diode 20 is presently in the high impedance state. Remember also that the voltage of the capacitor 16 is ever increasing because of the collapsing magnetic field. The diode 20 and fluorescent lamp 17 will break down under this voltage and form a low impedance path discharging the capacitor 16. The discharging current flowing through the winding 19 begins to re-establish the collapsed magnetic field. This increasing magnetic field generates a voltage in the winding 14 of a polarity opposite that generated therein by the collapsing magnetic field. This new voltage in the winding 14 aids the charge on the capacitor 16 and their sum is sufficient to overcome the voltage of the direct current source 12 and switch the diodes 13 into the high impedance state. The fluorescent lamp 17 is operating again and capacitor 16 is discharging through the discharge path 18. The diodes have completed switching conductive states and the magnetic field in the transformer 15 has been re-established in the same direction as previously. The fluorescent lamp 17 was off for only a short time, and the switching occurs very rapidly.

As the capacitor 16 discharges, the voltage across the fluorescent lamp 17 decreases until the fluorescent lamp 17 attempts to recover. The discharging current decreases and the switching of the diodes 13 and 20 back to their original states is initiated. The decreasing magnetic field further discharges the capacitor 16 and generates voltages in the windings 14 and 19. The voltage across the winding 19 is conjunction with the further discharged capacitor 16 effect the low impedance state in the diode 13. The direct current source 12 then begins to charge the capacitor 16. The magnetic field begins to build up causing a voltage to be generated in the winding 19 which forces the diode 20 into the high impedance state.

Figure 2:
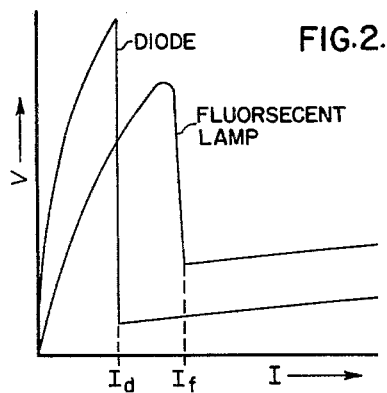
FIG. 2 shows the VI characteristics curve illustrating the negative resistance characteristics of a fluorescent lamp and diodes employed in the invention.

The fluorescent lamp 17 triggers this circuit because it has two operating states in negative resistance relationship which are responsive to the voltage across the lamp. The diodes 13 and 20 have similar operating states which are in negative resistance relationship which can be effected by the voltages across the diodes. The approximate characteristic curves of the fluorescent lamp 17 and diodes 13 and 20, shown in FIG. 2, illustrate this similarity. The steep slope seen in both curves at low currents is the high impedance state. The relatively flat slope at higher currents is the low impedance state. In FIG. 2, $I_f$ is the recovery current of the fluorescent lamp 17, and is higher than $I_d$ the recovery current of the diodes. Thus, the fluorescent lamp 17 is first to attempt recovery and initiates the switching of the states. If the diodes had been selected to recover at a higher current than the fluorescent lamp 17, the diodes would have initiated the circuit and would be self-switching. The conducting diode would recover and cause the nonconducting diode to break down. If this circuit operation is to be symmetrical, the diodes must be reasonably matched. In the fluorescent lamp application of this invention the matching problem is not encountered because the fluorescent lamp 17 initiates both switchings and the operation is therefore necessarily symmetrical.

Figure 3:
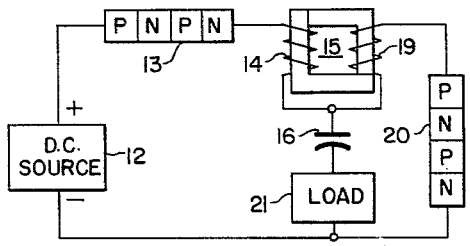
FIG. 3 shows a schematic diagram in which the diodes are self-switching.
Figure 4:
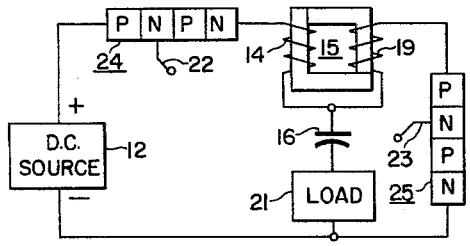
FIG. 4 is a schematic diagram of the invention showing biased self-switching diodes.

In FIG. 3 is shown a circuit having a load 21 which is not a negative resistance device such as a fluorescent lamp. In the circuit of FIG. 3, the diodes are self-switching and should be closely matched. FIG. 4 illustrates a circuit employing silicon controlled rectifiers. The voltages applied at points 22 and 23 control the recovery of transistor 24 and transistor 25 respectively. The symmetry and frequency of operation may be controlled by adjusting these voltages. The biasing potential could be supplied by batteries or from the direct current source 12 through a bleeder resistor system.

Referring now to FIG. 5, fluorescent lamps have very little resistance in the breakdown state and might require a series ballast to prevent short circuiting. Reactances are generally used for this purpose because they do not consume real power and, accordingly, aside from small resistance losses, do not generate heat. The reactances of the windings 14 and 19 of the transformer 15 could be designed to accommodate this ballast function as well as activating the diodes. Note that the transformer 15 provides a reactance in both conducting paths. To supply the necessary reactance the transformer 15 may have to be non-saturating. Such transformers tend to be bulky and could constitute a major cost of the circuit. This bulk may be decreased by adding an inductor 26 in series with the fluorescent lamp 17 as shown in FIG. 5. The inductor 26 is common to both conductive paths and aids the transformer 15 in providing a ballast reactance. The energy stored, and voltages generated by the inductor 26 supplement the activating function of the transformer 15.

Referring again to FIG. 5 a switch 27 is shown and is used in starting the fluorescent lamp 17. Initially, both diodes and the fluorescent lamp 17 are in the recovered or high impedance state. When the switch 27 is closed a low leakage current flows through the charge path 11 (see FIG. 1). This leakage current establishes a magnetic field in the transformer 15. When the switch is opened the current stops and the magnetic field collapses generating a voltage across the winding 14 which aids the voltage of the direct current source 12. The sum of these voltages breaks down the diode 13 and fluorescent lamp 17. The direct current source 12 then begins to charge the capacitor 16 through the charge path 11.

Another starting circiut is shown in FIG. 6. A switch 28 is employed to serially connect the winding 14, inductor 26, resistor 29, filament heaters 30 and 31, and D.C. source 12. Filament heaters 30 and 31 preheat the filaments of the fluorescent lamp 17 causing the fluorescent lamp 17 to break down at a lower voltage. More starting current passages through this circuit than through the circuit of FIG. 5 because the high impedance fluorescent lamp is by-passed. The higher starting current will establish a larger magnetic field in the transformer 15 and produce a correspondingly greater starting voltage across the fluorescent lamp 17 and diode 13. The resistor 29 is provided to limit the starting current.

It will be recognized that the objects of the invention have been achieved by providing a faster and more stable inverter circuit which employs semiconductor switches in conjunction with a transformer which stores the switching energy. Greater efficiency results from the hyperconductive characteristic of the diodes and the absence of resistance in the remaining components. No matching of switching characteristics is required when the fluorescent lamp 17 triggers both half cycles of the circuit operation.

While a best embodiment of the invention has been illustrated and described in detail, it is to be particularly understood that the invention is not limited thereto or thereby.

I claim as my invention:

1. In an inverter circuit for energizing a discharge device from a D.C. source, said circuit comprising:
    (a) a charge path extending from said D.C. source and serially connecting a first switching means, a first winding of a transformer having two closely coupled windings, a capacitor, and said discharge device, said charge path delivering current from said D.C. source to said discharge device in a first direction while simultaneously charging said capacitor;
    (b) a discharge path extending from said capacitor and serially connecting a second winding of said transformer, a second switching means, and said discharge device, said discharge path discharging said capacitor delivering current to said discharge device in a second direction;
    (c) said first switching means having a conductive state and a nonconductive state responsive to the voltage thereacross, said conductive state being established in said first switching means when said D.C. source delivers current to said discharge device, said nonconductive state being established in said first switching means when said capacitor delivers current to said discharge device;
    (d) said second switching means having a conductive state and a nonconductive state responsive to the voltage thereacross, said conductive state being established in said second switching means when said capacitor delivers current to said discharge device, said nonconductive state being established in said second switching means when said D.C. source delivers current to said discharge device;
    (e) said discharge device having a predetermined negative resistance characteristic to rapidly stop current flow therethrough when said current decreases to a predetermined value, with the resulting rapid cessation of current flow in either of said current paths initiating current flow in the other of said paths by virtue of the coupling between said transformer windings.

2. In an inverter circuit for inverting direct current from a source into alternating current for operating a gaseous discharge device, the combination comprising:
    (a) said gaseous discharge device having a high impedance state and a low impedance state responsive to the voltage thereacross in negative resistance relationship;
    (b) a first energy storing means which stores energy from said source while said source delivers current to said gaseous discharge device in the forward direction, said first energy storing means then delivering current to said gaseous discharge device in the reverse direction;
    (c) a first switching means serially connected between said source and said gaseous discharge device, said first switching means having a conductive state which is established therein when said source is delivering current to said gaseous discharge device, said first switching means having a nonconductive state which is established therein when said first energy storing means is delivering current to said gaseous discharge device;
    (d) a second switching means serially connected between said energy storing means and said gaseous discharge device, said second switching means having a conductive state which is established therein when said first energy storing means is delivering current to said gaseous discharge device, said second switching means having a nonconductive state which is established therein when said source is delivering current to said gaseous discharge device; and
    (e) a second energy storing means for providing the energy necessary to establish said states in said switching means, said second energy storing means responsive to cessation of current through said gaseous discharge device to release the energy stored in said second energy storing means to rapidly switch said first and second switching means.

3. The inverter circuit as specified in claim 2 wherein, said first energy storing means is a capacitor which charges from said source as said source is delivering current to said discharge device in said forward direction, and which discharges through said discharge device delivering current thereto in said reverse direction.

4. The inverter circuit as specified in claim 2 wherein, said first switching means is a first semiconductor device and said second switching means is a second semiconductor device.

5. The inverter circuit as specified in claim 2 wherein, said second energy storing means is a transformer having a conductive winding in series with each of said switching means, said transformer having a magnetic field established and maintained therein by the current delivered to said discharge device from the conducting one of said switching means.

6. The inverter circuit as specified in claim 2 wherein, said gaseous discharge device is a fluorescent lamp.

References Cited by the Examiner

UNITED STATES PATENTS

| 1,919,977 | 7/1933 | Gerald | 315—230 |
| 2,609,506 | 9/1952 | Siezen | 315—230 |

FOREIGN PATENTS 887,208  1/1962  Great Britain.

JOHN W. HUCKERT, *Primary Examiner.*

DAVID J. GALVIN, *Examiner.*